UNITED STATES PATENT OFFICE.

ABRAHAM KRONSTEIN, OF KARLSRUHE, GERMANY.

PROCESS OF MAKING VARNISH-GUM.

No. 799,065. Specification of Letters Patent. Patented Sept. 12, 1905.

Application filed January 21, 1901. Serial No. 44,179.

*To all whom it may concern:*

Be it known that I, ABRAHAM KRONSTEIN, chemist, a subject of the Emperor of Austria-Hungary, residing at 95 Kriegsstrasse, in the city of Karlsruhe, in the Grand Duchy of Baden, German Empire, have invented a certain new and useful Process of Making Varnish-Gums, of which the following is a specification.

In a previous application for United States Letters Patent I have shown that under certain conditions solid substances will be obtained from drying-oils, the said substances being insoluble in the ordinary solvents of the resins and oils. This quality is in particular possessed by mixtures which contain more than 50 % (fifty per cent.) of wood-oil. I have now found that these solid bodies which are insoluble in the ordinary solvents of resins, oils, and balsams may also be obtained from wood-oil which has been mixed with a certain amount of resins, and it has been found that according to the nature of the particular kind of resin different quantities of the same will be necessary to produce the solidification of the wood-oil. It seems that the amount of volatile oil present in the resin influences the solidification process.

The solubility of the product obtained by heating liquid wood-oil with resins depends besides on the nature of the resin, also upon the duration of the heating process. If sufficient resin is added to so-called Chinese "wood-oil" or "tung-oil," being the oil of *Elaeococca vernicia* or *Aleurites cordata*, in a liquid state and the mixture heated at an elevated temperature for a sufficient length of time, preferably, though not necessarily, at the exclusion of air, the mixture becomes viscid and finally solidifies. This solidification takes place during the heating process itself and yields substances which are a perfect substitute for the expensive gum-copal and amber and they show the same property of being insoluble in all solvents. These solid products show an approximate melting-point of from about 280° to 350° centigrade. The brittleness of the resins has been entirely lost in the new products, which show a high degree of elasticity, and like the ordinary hard resins of nature only become soluble if remelted at a higher temperature. In this condition they are soluble in oil of turpentine, benzol, and camphor-oil. If the new products are melted, they yield a thick oil which is soluble in the ordinary solvents and is suitable for use in the manufacture of japans and varnishes.

If a greater quantity of resin is added to the wood-oil than is necessary for solidification at a temperature of about 200° centigrade, the mixture loses the property of becoming solid and insoluble during the heating process itself. These mixtures, on the contrary, remain liquid during the heating process and only when cooled down they yield at ordinary temperature solid resinous bodies which are distinguished by a high degree of elasticity and which are soluble in the ordinary solvents, such as oil of turpentine, benzol, and camphor-oil.

In applying my invention to the resins and gums of commerce it has been found that an addition of as much as fifty per cent. of gum-dammar does not yet prevent the solidification of wood-oil during the heating process. About the same percentage applies to the use of Venetian turpentine, and the limit is very near the same for melted amber, gutta-percha, and asphaltum, while if copal is used as an admixture the percentage may be as high as seventy per cent.; on the other hand, of resin or colophony only about thirty per cent may be added for producing the same effect. I may also use mixtures of different kinds of resins for producing a solidification and the formation of insoluble bodies during the heating process. I may also make use of additions of drying-oils—such as linseed-oil, rape-seed oil, cotton-oil, and of similar oils—to the resins and mix these with the wood-oil. The formation of such solid, insoluble, and elastic products from resins is due to polymerization of the wood-oil, the limit at which polymerization takes place depending, of course, in each case upon the nature of the mixture of the resin or of mixtures of different kinds of resin with drying-oils. There will, however, be a certain limit of temperature and of percentage for each mixture, which has to be found by experience. The thus-obtained products, which, as aforesaid, are perfect substitutes for the expensive hard resins used heretofore, may be employed in the manufacture of japans and varnishes and for electrical purposes for the manufacture of insulating material, cable-wax, and the like.

It is preferable to avoid the access of air in order to exclude the possibility of decomposition and in order to obtain pure light-colored products. On the other hand, if the process is carried on under access of air, oxidation and decomposition will take place, giving rise to the formation of colored products of inferior quality. If the heating process is interrupted before solidification sets in, the process only yields an oil which is still soluble in the ordinary solvents and is suitable for use in the manufacture of japans and varnishes. The mode of procedure to be followed in carrying out my invention will be illustrated by the following examples:

Example 1: Eighty pounds of dammar-resin are dissolved in one hundred and twenty pounds of wood-oil and are then heated up to about 200° to 250° centigrade. The solution solidifies after the heating process has gone on for about sixteen to eighteen hours, solidification setting in during the heating process itself and yielding a product which is insoluble in oil of turpentine, benzol, and the like. In these products the resinous constituent has lost its brittleness and becomes so intimately combined with the wood-oil that it will not be directly acted upon by alkalies, as is the case in mechanical mixtures of drying-oils and resin or colophony or other resins or in such mixtures where the resin was added to the solidified and afterward molten wood-oil. By my invention I obtain bodies which will not be attacked by alkalies under ordinary conditions and which must be fused before they become open to the action of any solvents or reagents. If the temperature is raised up to about 300° centigrade, the product melts and yields an oil which is soluble in oil of turpentine, benzol, and the like; yield, theoretical.

Example 2: Forty pounds of resin are dissolved in one hundred and sixty pounds of wood-oil and treated as shown with reference to Example 1.

Example 3: A mixture of each forty pounds of dammar-resin and linseed-oil are dissolved in one hundred and twenty pounds of wood-oil and treated in like manner as in Example 1.

If the heating is interrupted before solidification takes place in the examples mentioned under 1 to 3, the process yields soluble products which are of a very high consistency and even solid at ordinary temperature and which are of importance in the manufacture of japans and of linoleum.

The effects of the use of an excess of resin will be illustrated by the following examples:

Example 4: One hundred and twenty pounds of dammar-resin are dissolved in eighty pounds of wood-oil and heated for twenty-four hours. The product is soluble in oil of turpentine, benzol, and the like and yields rapidly-drying japans.

Example 5: A mixture of each sixty pounds of amber and linseed-oil is dissolved in eighty pounds of wood-oil and is, for instance, heated for twenty-four hours. The product is soluble in oil of turpentine, camphor-oil, and the like.

Example 6: A mixture of one hundred and twenty pounds of asphaltum and eighty pounds of wood-oil is treated as shown with reference to Example 5. The product has the same quality as that obtained in Example 5.

I am aware that it is old to produce a substitute for varnish-gum from a mixture of ordinary resin and wood-oil or tung-oil with or without the addition of hardening and drying chemicals; but in the former process referred to the solidification of the mixture was produced by allowing the heated mixture to cool and harden, whereby a product was obtained which could be melted at a low temperature and did not withstand the action of alkalies and which even in the presence of the majority of solidification promoting chemicals as treated by the former process was also soluble in the ordinary solvents of resins and oils, while in my invention the product obtained which is insoluble and proof against the action of alkalies and fuses at a very high temperature only is produced, so to speak, by a kind of coagulation at very high heat and not by the cooling of a liquid. Besides, the former process was limited to the use of resin only and could not be employed with other kind of resins, while my process applies to any kind of resins as well, including hard resins or natural varnish-gums, such as gum-dammar and copal-gum also, and in my process no excess of resin and no previous liquefaction of the same or of other resins employed is necessary and no more resin is employed in the mixture than is necessary to prevent the liquefaction of the wood-oil or tung-oil during the heating process.

What I claim, and desire to secure by Letters Patent of the United States, is—

1. The process for increasing the consistency of wood-oil or tung-oil substantially as described and for manufacturing artificial varnish-gums which consists in heating a mixture of a sufficiency of any suitable ordinary commercially pure resin with wood-oil and continuing the heating until the liquid coagulates and solidifies and becomes insoluble during the heating process and allowing the solid product obtained to cool.

2. The process for increasing the consistency of wood-oil or tung-oil and for manufacturing therefrom solid substitution products for varnish-gums which consists in mixing ordinary resin with an excess of wood-oil or tung-oil substantially as described and heating the mixture until it solidifies during the heating process and then interrupting the heating and allowing the solid product obtained to cool.

3. The process for increasing the consistency of wood-oil or tung-oil, substantially as described and for manufacturing artificial varnish-gums which consists in heating a mixture of said wood-oil or tung-oil with any suitable ordinary commercially pure resin the amount of which is governed by the volatile constituents of the resin, to a temperature of about 200° to 250° centigrade and continuing the heating, until the liquid coagulates and solidifies and becomes insoluble during the heating process and allowing the solid product obtained to cool.

4. The process for treating wood-oil or tung-oil with resins which consists in mixing an excess of liquid wood-oil with a suitable amount of resin, adding drying-oils and heating the mixture to a temperature about or above 200° centigrade until solidification sets in.

5. As a new product an alkali-resisting solid compound consisting of an insoluble, difficultly-fusing mixture of wood-oil or tung-oil and resin and having an approximate melting-point of from 280° to 350° centigrade.

In witness whereof I have hereunto signed my name in the presence of two subscribing witnesses.

ABRAHAM KRONSTEIN.

Witnesses:
HENRY HASPER,
WOLDEMAR HAUPT.